United States Patent [19]

Christine

[11] Patent Number: 4,695,337
[45] Date of Patent: Sep. 22, 1987

[54] APPARATUS AND METHOD FOR ATTACHING A FITMENT TO A WEB OF FILM

[75] Inventor: William Christine, Catasauqua, Pa.

[73] Assignee: Baxter Travenol Laboratories, Inc., Deerfield, Ill.

[21] Appl. No.: 697,534

[22] Filed: Feb. 1, 1985

[51] Int. Cl.[4] ............................................. B32B 31/20
[52] U.S. Cl. ........................................ 156/69; 53/469; 53/478; 156/253; 156/499; 156/514; 156/518; 493/203
[58] Field of Search ................... 53/469, 478; 156/69, 156/251, 253, 499, 513–516, 518; 493/203

[56] References Cited

U.S. PATENT DOCUMENTS

| | | | |
|---|---|---|---|
| 3,069,303 | 12/1962 | Scholle | 156/253 |
| 3,244,576 | 4/1966 | Swartz | 156/513 |
| 3,425,887 | 2/1969 | Bowen | 156/518 |
| 3,434,908 | 3/1969 | MacDonald | 156/514 |
| 3,490,979 | 1/1970 | Calvert et al. | 156/366 |
| 3,783,080 | 1/1974 | Goglio | 156/514 |
| 3,812,572 | 5/1974 | Weikert | 29/421 R X |
| 3,821,046 | 6/1974 | Runge | 156/69 |
| 3,868,891 | 3/1975 | Parish | |
| 3,909,340 | 9/1975 | Selbeck | 156/500 |
| 4,055,032 | 10/1977 | Hammond | 156/514 X |
| 4,120,134 | 10/1978 | Scholle | 53/434 |
| 4,166,412 | 9/1979 | Versteege | 156/514 X |
| 4,246,062 | 1/1981 | Christine | 156/498 |
| 4,326,574 | 4/1982 | Pallaroni | |
| 4,451,249 | 5/1984 | deBin | 493/204 |

FOREIGN PATENT DOCUMENTS

8116/66  7/1966  Australia .

Primary Examiner—Robert A. Dawson
Attorney, Agent, or Firm—John P. Kirby; Paul C. Flattery; Robert M. Barrett

[57] ABSTRACT

An apparatus and method for attaching a fitment to a web of film in a form, fill, and seal packaging machine is provided. The apparatus includes a press for orienting the fitments on one side of a web of film, and a film piercer and sealer. The film piercer and sealer includes a heated face and tip and is designed to contemporaneously pierce and seal of web of film to the fitment.

32 Claims, 7 Drawing Figures

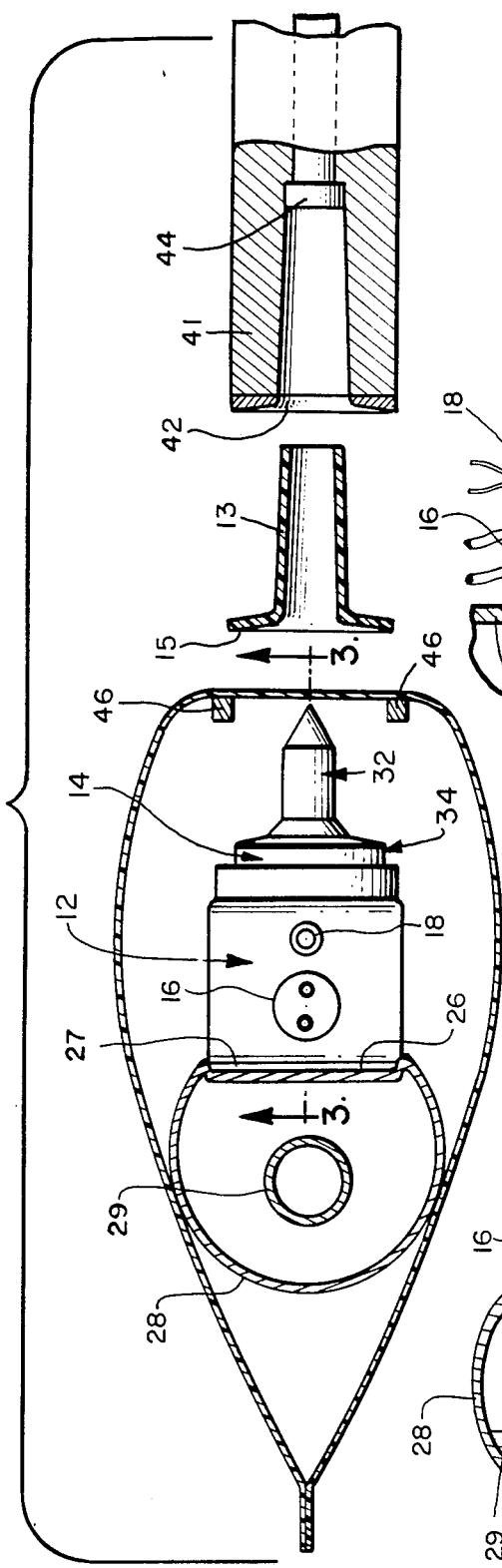
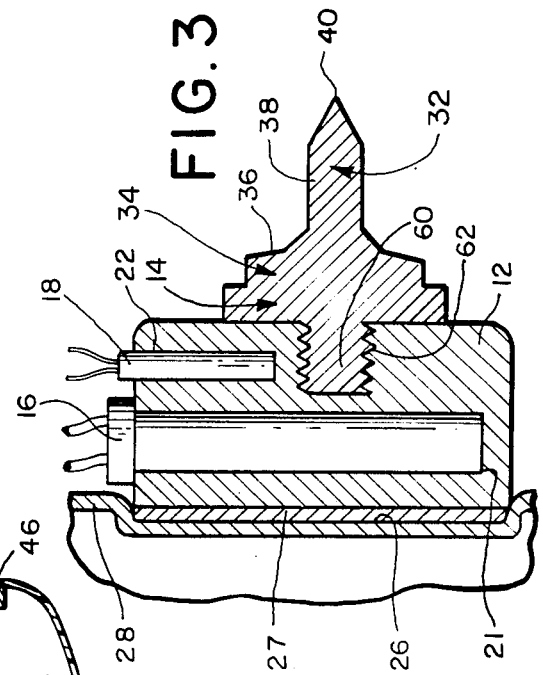
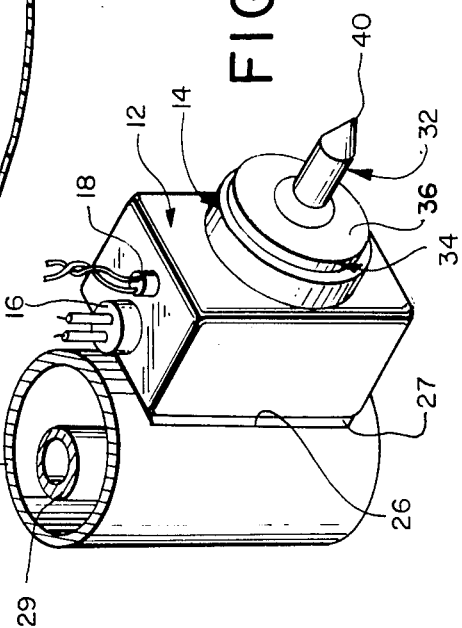
FIG. 1
FIG. 3
FIG. 2

APPARATUS AND METHOD FOR ATTACHING A FITMENT TO A WEB OF FILM

BACKGROUND OF THE INVENTION

This invention relates to an apparatus and method for attaching a fitment to a web of film. In particular, the present invention relates to an apparatus and method for attaching a fitment to a web of film in a form, fill, and seal packaging machine so that flexible containers with fitments are produced.

In some types of packaging arts including, inter alia, pharmaceutical, food products, and dairy products, it is desirable to make flexible containers that include means for accessing the container (hereinafter "fitments"). As used herein, the term fitments includes, without limitation, valves, ports, port and closure assemblies, and other means for accessing a container. Fitments provide ports for establishing fluid communication between the container and the outside environment. An example of a container utilizing a fitment is the VIAFLEX ® flexible container for parenteral solutions produced by Travenol Laboratories, Inc. of Deerfield, Ill.

Flexible containers with fitments may be produced by form, fill, and seal packaging machines. Form, fill, and seal packaging machines provide an apparatus for forming a web of film into a flexible container housing a desired product. Typically, these machines include a former or mandrel, a fill tube, and heat sealers. The former or mandrel forms the web of film into a tubular shape around a fill or film tube. The fill tube is utilized to dispense the material to be packaged into the tubular shaped web of film.

In a typical form, fill, and seal packaging machine, fitments are attached via an impulse heat sealing system. Usually, the impulse heat sealing system utilizes a ring heating element that has a shape substantially similar to the flange portion of the fitment. In an impulse type system, the ring member is not constantly heated but rather, is heated for a sufficient length of time to provide the ring member with enough heat energy to cause the web of film to melt and fusion seal to the fitment flange.

Although an impulse system utilizing a ring member can be utilized to produce a container with a fitment there are certain disadvantages. Impulse ring systems are hardware intense and accordingly contain many components that may break down and/or wear out and therefore need replacing. Moreover, these components provide a harbour for bacteria and contaminants that may contaminate the product to be packaged or the container itself. In an aseptic form, fill, and seal packaging machine this produces several disadvantages. Due to the multitude of the components in the impulse system, it is difficult to sterilize an impulse type system. Furthermore, it is difficult to ensure that sterility is maintained.

Depending on its end use, the web of film, to which the fitment is attached, may or may not include a prepierced hole. In the typical "bag in a box" design, the film is typically prepierced. To this end, the web of film is prepierced and the fitment is located over the prepierced hole so that there is fluid communication between the fitment and the container. The prior art has also utilized a method of passing the fitment through the prepierced hole. Both of these methods require that the fitment be located with precision over, or in, the prepierced hole, slowing down the production of the flexible containers.

Another disadvantage with the prior art methods of attaching fitments to a web of film is that the web of film is not sealed within the spout of the fitment. Moreover, because the web of film is not sealed within the spout of the fitment the container created is not as aesthetically pleasing and as functional as if the web of film were sealed within the spout. Furthermore, when the fitment hole is prepunched, there may be fluid communication between the tie layer of the film and the fluid contained within the container.

Thus, there is a need for a fitment attaching apparatus and method that overcomes the problems of the prior art.

SUMMARY OF THE INVENTION

The present invention provides a method and apparatus for attaching a fitment to a web of film in a form, fill, and seal packaging machine. The apparatus includes a press for orienting a fitment on one side of a web of film and an apparatus for contemporaneously piercing and sealing the web of film to the fitment. The film piercer and sealer includes a heated face and tip. The head tip and face cooperate to seal a portion of the film to a flange of the fitment and within a spout in the fitment.

The preferred method for attaching the fitment entails heating the film piercer and sealer. The fitment and film are then moved towards the film piercer and sealer. Before the film contacts the piercer and sealer it begins the process of softening or melting. As the film and fitment continue to move toward the piercer and sealer the tip of the piercer and sealer pierces the film and further softens the film. The film continues to move towards the piercer and sealer and the tip seals the film within the spout of the fitment while the heated face seals the film to the flange of the fitment. The film with fitment attached is then biased away from the piercer and sealer.

Accordingly, an advantage of the present invention is that it provides an apparatus for contemporaneously piercing and sealing a fitment to a web of film.

A further advantage of the present invention is that it provides a method for piercing a web of film and contemporaneously sealing a fitment to the web of film.

Another advantage of the present invention is that it provides an apparatus for sealing a web of film not only to the flange of the fitment but within a portion of the spout of the fitment.

Still a further advantage of the present invention is that it provides a film piercer and sealer that is continuously heated.

Moreover, an advantage of the present invention is that the thickness of the seal of the fitment to the film is not reduced at the end portions of the flange of the fitment.

A further advantage of the present invention is that the film piercer and sealer seals the fitment to the film so that there is essentially no fluid communication between the contents of the container and the tie layer of the film.

Another advantage of the present invention is that it provides a method for attaching a fitment to a web of film.

A still further advantage of the present invention is that it provides a film piercer and sealer that can be used in an aseptic form, fill, and seal packaging machine.

Another advantage of the present invention is that it provides an apparatus and method for providing a more sterile fitment attachment.

A further advantage of the present invention is that it provides an apparatus for attaching a fitment to a variety of films.

Moreover an advantage of the present invention is that the apparatus is pyrogen free, does not produce particles, and produces a high quality seal.

Another advantage of the present invention is that it provides a method and apparatus for attaching a fitment to a web of film that produces a more aesthetically pleasing package.

Additional features and advantages are described in, and will be apparent from, the Detailed Description of the Presently Preferred Embodiments and from the drawings.

BRIEF DESCRIPTION OF THE DRAWINGS

FIG. 1 illustrates a plan view of the film piercer and sealer of this invention.

FIG. 2 illustrates a top elevational view of the film piercer and sealer of FIG. 1.

FIG. 3 illustrates a cross-sectional view of the film piercer and sealer of FIG. 1 taken along lines 3—3 of FIG. 1.

DETAILED DESCRIPTION OF THE PRESENTLY PREFERRED EMBODIMENTS

Figure 4A:
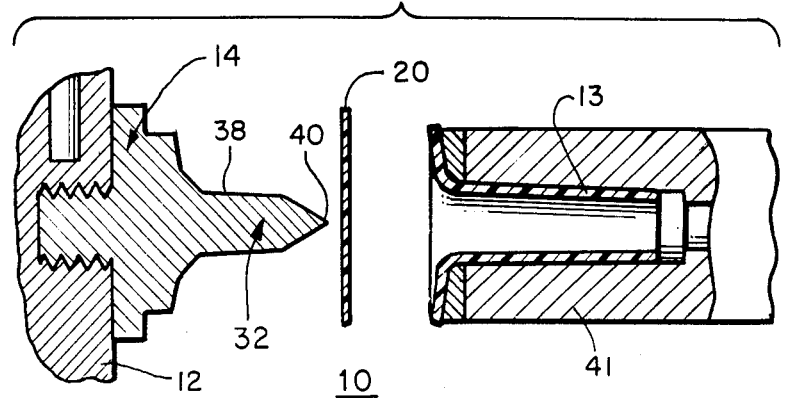
FIGS. 4a-4d illustrate a schematic of the film piercer and sealer sealing a fitment to a web of film.
Figure 4B:
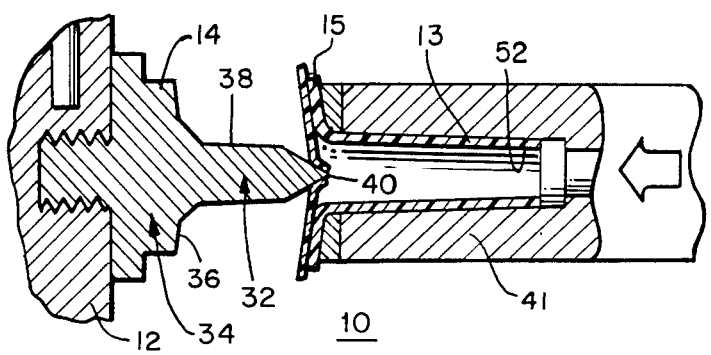
Figure 4C:
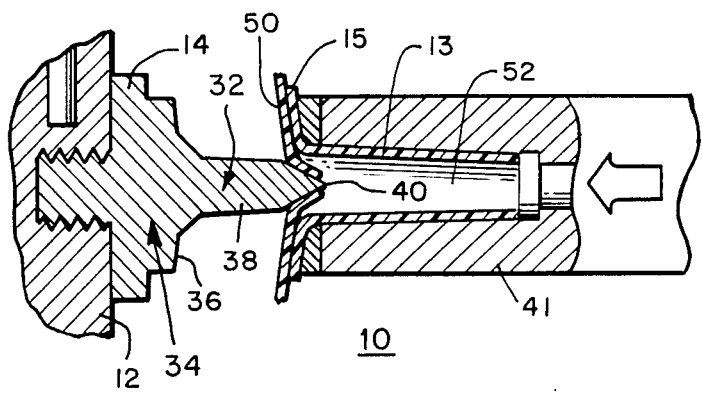

FIG. 1 illustrates the film piercer and sealer 10 of the present invention. The film piercer and sealer 10 functions to attach a fitment 13 to a web of film 20. This allows one in a form, fill, and seal packaging machine to make a container having a fitment 13.

The film piercer and sealer 10 includes a heat seal block 12 and heat sealer 14. The heat seal block 12 includes a cartridge heater 16 and a thermocouple 18. The heat seal block 12 is secured to a support block 24 by machine screws (not shown).

As illustrated in FIG. 3, the cartridge heater 16 and thermocouple 18 are located within angular channels 20 and 22, respectively, of the heat seal block 12. The cartridge heater 16 can be of any heater design known in the art that has controllable heating means. It has been found that the cartridge heater manufacturing by Chromalox, of Pittsburgh, Pa. has been found to produce satisfactory results in the presently described embodiment.

As illustrated in FIG. 2, the support block 24 is located within a recess 26 in the film tube 28. Because the support block 24, and accordingly the heat seal block 12 and heat sealer 14, are located within the recess 26, the majority of the heating elements may be located within the film tube 28. This provides an arrangement that may be readily sterilized and maintained as an aseptic environment. This is especially important in an aseptic form, fill, and seal packaging apparatus.

In use, a web of film 20 is passed through a former or mandrel (not shown), and holded into a tubular shape. The tubular shape is then passed over the film tube 28. The film tube 28 encloses a fill tube 29 through which the fluid or other material to be packaged is passed. As described in detail below, as the web of film 20 passes by the fitment seal and pierce apparatus 10, a fitment 13 is attached to the web of film 20.

Referring now to FIGS. 1-3, the heat sealer 14 includes a heat seal tip 32 and an abutment member 34. The abutment member 34 includes a face 36. As illustrated in FIG. 3, the face 36 of the abutment member 34 is not flat but rather has a slope of approximately 5° to 20°, and preferably has a slope of 8° to 10°. The slope of the face 36 ensures that the web of film 20 is sealed continuously to the flange 15 of the fitment 13.

The slope of the face helps to match the flexing characteristics of the film 20 and the flange 15 of the fitment 13. In order to ensure that the film 20 is not thinnest at the edge of the seal of the fitment 15, it is necessary to have the least time/pressure at the edge of the seal. The angle of the face 36 reduces the pressure at the edge of the seal and accordingly provides good peel strength.

The heat seal tip 32 includes an elongated body 38 and a point 40. The angle and shape of the point 40 is critical. The shape of the point 40 will vary depending on the nature of the film 20 and the hole desired. It has been found that a heat seal tip 32 with a conical shaped tip is desirable for a laminate film composition such as polyethylene/nylon/polyethylene. Preferably, the angle of the apex of the conical tip is between approximately 15° to about 45°. However, it should be noted that the shape of the heat seal tip 32 need not be conical.

The angle of the heat seal tip 32 must conform to the draft angle of the fitment 13 to provide a satisfactory release after the fitment has been sealed to the web of film 20. The diameter of the elongated body 38 of the heat seal tip 32 is approximately determined by the following formula:

Diameter = Inner diameter of the
fitment − (2 × thickness of the film) + 0.002 to 0.008.

The heat sealer 14 is preferably constructed from a thermal conductive material such as metal. Aluminum and alloys of copper have been found to provide sufficient thermal conductivity to function as a good material for the heat sealer 14. It is also preferable that the surface of the heat sealer 14 be treated with a release type coating to prevent the web of film 26 from sticking to the heat sealer 14. Various treatments are available, it has been found that a Teflon of Teflon/ceramic coating provides sufficient release characteristics. By varying the coating one may vary the film used.

In use, the heat seal block 12, and specifically the cartridge heater 16 heats the heat sealer 14 to a temperature above the temperature at which the web of film 20 melts, i.e. the softening point of the film. In contrast to prior art systems, the fitment piercer and sealer 10 of the present invention is constantly heated. Therefore, the heat sealer 14 is maintained at a constant temperature.

As illustrated in FIG. 1, located on the second side of the web of film 26 is a heat seal press head 41. The heat seal press head 41 includes a channel 42 which is designed to receive and hold a fitment 13. The heat seal press head 41 also includes an ejector pin 44. The heat seal press head 41 may be any heat seal press head known in the art including those disclosed in U.S. Pat. Nos. 4,246,062 and 3,894,381. The heat seal press head 41 is connected to means (not shown) for urging the heat seal press head 41, and thereby the fitment 13, towards the web of film 20 and thereby the film piercer and sealer 10.

After the fitment 13 has been sealed to the web of film 20, the heat seal press head 41 retracts away from the web of film 20, and the ejector pin 44 ejects the fitment 13 from the channel 42. The heat seal press head 41 continues to retract, and the ejector pin 44 moves forward to assure that the fitment 13 is no longer confined within the channel 42 of the heat seal press head. The web of film 20 then advances to the next station while the heat seal press head 41 is loaded with a second fitment.

To ensure that the web of film 20 with the fitment 13 attached thereto, does not stick on the heat sealer 14, stripper members 46 are located on the heat seal block 12. The stripper members 46 are biased fingers that push the web of film 20 away from the fitment sealer and piercer 10 as the heat seal press head 41 begins to withdraw away from the web of film 20. When a new fitment 13 is moved against the web of film 20 by the heat seal press head 41, the heat seal press head 41 urges the fingers against the heat seal block 12.

As illustrated in FIG. 3, the heat sealer 14 may be unscrewed from the heat seal block 12. To this end, the heat sealer 14 includes a threaded portion 60 that is received within a threaded channel 62 in the heat seal block 12. This allows the heat sealer 14 to be replaced without replacing the entire fitment piercer and sealer apparatus 10.

FIG. 4 illustrates the piercing and sealing of a web of film 20 to the fitment 13 utilizing the film piercer and sealer 10 of the present invention. As illustrated in position 1, the web of film 20 is in juxtaposition to the heat seal tip 32 of the heat sealer 14.

In position 2, a portion of the web of film 20 in juxtaposition to the heat seal tip 32 begins to soften, and the point 40 pierces the web of film 20 softening the surrounding portions of the web of film 20.

In position 3, the point 40 and a portion of the elongated body 38 of the heat seal tip 32 has pushed all the way through the web of film 20 piercing it, and entering the shaft 52 of the fitment 13. The heat seal tip 32 begins to seal a portion of the film 20 to the shaft 52 of the fitment 13.

In position 4, the point 40 and elongated body 38 of the heat seal tip 32 is received within the shaft 52 of the fitment 13 and the face 36 of the abutment member 34 seals a portion of the web of film 50 to the flange 15 of the fitment 13. At the same time, the heat seal tip 32 seals a portion of the web 54 to the inner walls 56 of the shaft 52 of the fitment 13.

Thus, a method of contemporaneously piercing and sealing the fitment 13 to a web of film 20 is disclosed. Moreover, through this method, a portion 54 of the web of film 20 is sealed within the shaft 52 of the fitment 13. This not only provides a more asthetically pleasing fitment 13 attachment, but also provides a more continuous seal between the fitment 13 and web of film 20.

Figure 4D:
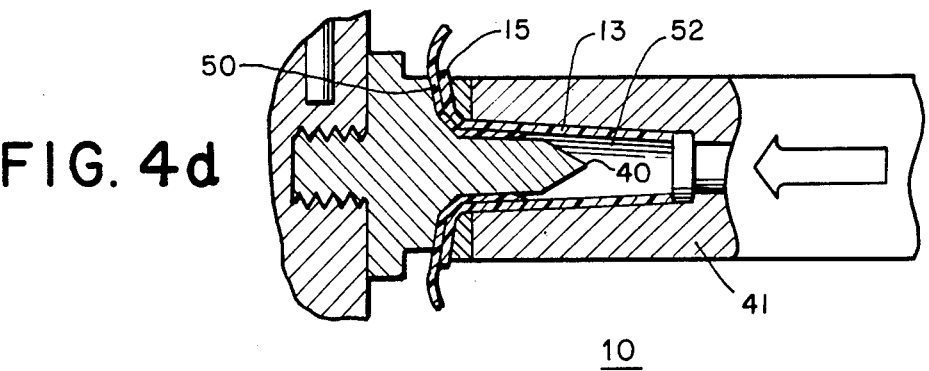

Preferably, as illustrated in FIG. 4d, the portions 54 of the web of film is sealed within the shaft 52 of the fitment 13 so that there is no fluid communication between the tie layer of the film and the product contained within the container. To this end, the top layer of the film 20 melts so that the middle layers (e.g. tie layer) are not exposed.

After the fitment 13 has been sealed to the web of film 20, the heat seal press head 41 moves away from the web of film 20 causing the stripper members 46 to push the web of film and fitment away from the fitment piercer and sealer 10. The web of film 20 then advances to the next station, continuing the cycle.

One example of a program, including the durations of each seal, utilized to attach fitments 13 to a web of polymeric film 20 is as follows:

$T_1$—0.09 seconds—the heat seal press head advances to pick up a fitment;
$T_2$—0.55 seconds—dwell at pick up;
$T_3$—0.03 seconds—advance to preheat;
$T_4$—0.58 seconds—dwell at preheat;
$T_5$—0.12 seconds—advance to seal position;
$T_6$—0.66 seconds—dwell at seal position;
$T_7$—0.15 seconds—reset.

The timer parameters are for a polymeric film having a polyethylene/nylon/polyethylene construction. The heat seal tip is heated to a temperature of 420° F.

Of course, it should be noted, that the process set forth above is illustrative, and not limiting. Accordingly, the process may include more steps, different time durations, or may be a continuous process. The process of piercing and sealing will vary with the materials utilized.

Due to the novel construction of the film piercer and sealer 10 and the method of its operation, the film piercer and sealer 10 is a viable method for form, fill, and seal packaging machines running at speeds of up to 50 packages per minute. Moreover, the film piercer and sealer 10 provides an apparatus that may be used in an aseptic form, fill, and seal packaging machine. This is because the film piercer and sealer 10 provides a clean, nonpyrogenic surface free of particulate matter and void of crevices, cracks, or fringes that could be a harbour for bacteria and the like.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. An apparatus for attaching a fitment having a flange and an aperture to a web of film in a form, fill, and seal flexible bag making machine comprising:
   means for orienting the fitment on one side of the film including a movable press and ejector pin; and
   means for contemporaneously piercing and sealing the film to the flange of the fitment and within the aperture of the fitment.

2. The apparatus of claim 1 wherein the movable press urges the fitment and film towards the means for contemporaneously piercing and sealing.

3. The apparatus of claim 1 wherein the means for contemporaneously piercing and sealing the film to the fitment includes a heated face, and a heated tip extending from the heated face.

4. The apparatus of claim 3 wherein the heated face has a slope of approximately 5° to about 20°.

5. An apparatus for attaching a fitment including a flange and aperture to a web of film comprising:
   means for orienting the fitment on one side of the film; and
   heating means for sealing a portion of the film to the flange and within the aperture of the fitment.

6. The apparatus of claim 5 wherein the heating means includes a heated face, and a heated tip extending from the heated face.

7. The apparatus of claim 6 wherein the heating means is maintained at a temperature greater than the softening point of the film.

8. The apparatus of claim 6 wherein:
the means for orienting the fitment includes a movable press; and
the heating means includes stripper means for removing the fitment and film from contact with the heating means after the fitment is attached to a portion of the film.

9. The apparatus of claim 6 wherein the heated tip has an apex having an angle of approximately 15° to about 42°.

10. The apparatus of claim 6 wherein the heated face has a slope of approximately 5° to about 20°.

11. An apparatus for attaching a fitment to a web of film in a form, fill, and seal flexible bag making machine having a film tube comprising:
means for orienting a fitment on one side of the film;
a heat sealer located within a recess in the film tube, the heat sealer including a heated face and a heat seal tip extending from the face, the heat seal tip and heated face cooperating to pierce and seal, a portion of the film to a flange of the fitment and within an aperture of the fitment; and
means for energizing the heat sealer located within the film tube.

12. The apparatus of claim 11 wherein the heated face and tip are maintained at a temperature greater than the softening point of the film.

13. The apparatus of claim 11 wherein the heat seal tip has an apex having an angle of approximately 15° to about 42°.

14. The apparatus of claim 11 wherein the heated face has a slope of approximately 5° to about 20°.

15. The apparatus of claim 11 wherein the means for orienting the fitment includes a movable heat press which urges the film and fitment towards the heat sealer.

16. The apparatus of claim 11 wherein the diameter of the heat seal tip is determined by the formula:

Diameter = Inner diameter of the fitment − (2 × thickness of film) + 0.002 to 0.008.

17. An apparatus for attaching a fitment including a flange and aperture to a web of film comprising:
means for orienting a fitment on one side of the film; and
heating means for piercing and sealing the film to the fitment, the heating means including a heated face and a heated tip extending from the heated face, the heated tip and face cooperating to seal a portion of the film to the flange and within the aperture of the fitment.

18. The apparatus of claim 17 wherein the heated face and tip are maintained at a temperature greater than the temperature of the film.

19. The apparatus of claim 17 wherein the heated tip has an apex having an angle of approximately 15° to about 42°.

20. The apparatus of claim 17 wherein the heated face has a slope of approximately 5° to about 20°.

21. The apparatus of claim 17 wherein the diameter of the heated tip is approximately determined by the formula:

Diameter = Inner diameter of the fitment − (2 × thickness of film) + 0.002 to 0.008.

22. The apparatus of claim 17 wherein:
the means for orienting the fitment includes a movable press having an ejector pin; and
the heating means includes a stripper for removing the film and attached fitment from the heated face and tip.

23. The apparatus of claim 17 wherein:
the web of film passes over a film tube; and
the heating means is located within a recess in the film tube.

24. The apparatus of claim 23 including energizing means located within the film tube for energizing the heating means.

25. A method for attaching a fitment to a web of film utilizing a heat seal apparatus including a heated face and heated tip comprising the steps of:
heating the heat seal apparatus;
orienting the fitment on one side of the film;
moving the fitment and film towards the heat seal apparatus so that a portion of the film begins to melt;
continuing to move the fitment and film towards the heat seal apparatus so that the heated tip pierces the film and is received within an aperture in the fitment; and
continuing to move the fitment and film towards the heat seal apparatus so that the film is sealed to a flange of the fitment and within the aperture of the fitment.

26. The method of claim 25 wherein the heat seal apparatus is heated to a temperature greater than the melting point of the film.

27. The method of claim 25 including the step of moving the fitment and film away from the heat seal apparatus after the fitment is secured to the film.

28. The method of claim 27 including the steps of:
moving the film a desired distance; and
orienting a second fitment to be sealed to the film at a new location.

29. The method of claim 25 including the step of allowing the film within the aperture to melt sufficiently so that middle layers of the film are not exposed.

30. A method of attaching a fitment to a web of film in an aseptic form, fill, and seal flexible bag making machine comprising the step of contemporaneously piercing and sealing the film to the fitment.

31. The method of claim 30 including the step of sealing a portion of the film within an aperture in the fitment.

32. The method of claim 31 including the step of melting a portion of the film so that middle layers of the film within the aperture are not exposed.

* * * * *